Sept. 22, 1936.  W. L. ADAMS  2,055,448

DRAG HANDLE MECHANISM FOR FISHING REELS

Filed March 13, 1934

INVENTOR
WALTER L. ADAMS

BY

ATTORNEYS

Patented Sept. 22, 1936

2,055,448

UNITED STATES PATENT OFFICE 2,055,448

DRAG HANDLE MECHANISM FOR FISHING REELS

Walter L. Adams, Akron, Ohio, assignor to The Enterprise Manufacturing Company, Akron, Ohio, a corporation of Ohio Application March 13, 1934, Serial No. 715,313

1 Claim. (Cl. 242—84.5)

The present invention relates to fishing reels and particularly reels of the larger types such as usually employed in salt water fishing. Reels of this type are frequently provided with drag handle mechanisms by means of which frictional resistance to varying degrees may be exerted upon the rotation of the spool and line. For a further and more complete understanding of the invention, attention is specifically directed to the drag handle mechanism shown and described in my prior Patent No. 1,932,360, dated October 24, 1933, of which the present construction is an improvement.

In the drag mechanism shown in the aforesaid patent, frictional resistance is provided between the driving gear and the handle or crank-shaft by a pile of friction disks located at the gear and having non-rotative connection with the gear and shaft respectively and frictional engagement with each other. In that patent the range of adjustability was limited and defined by a split washer through which pressure was applied from the so-called starwheel to a sleeve and thence to the friction disks or pile. This necessarily restricted the control of the fisherman over the degree of friction to be employed and made accurate and fine adjustments difficult, as the split washer had but a limited compressibility.

The present invention is an improvement upon the construction shown in the prior patent as a greater range of adjustment is permissible, the extent of rotation of the star wheel from completely off to full-on position being increased several times over the old construction. This result is obtained in the present invention in the same limited space which was used in the old form so that the desirable compactness of the drag mechanism is not sacrificed.

It will be understood that the invention herein described is not limited to exact conformity with the details of construction illustrated, but may be varied and altered all within the scope of the invention. Only those parts of the reel structure which are directly concerned and connected with the improvement are illustrated, reference being made to the prior patent for a fuller disclosure of the other details of the reel structure.

Figure 1:
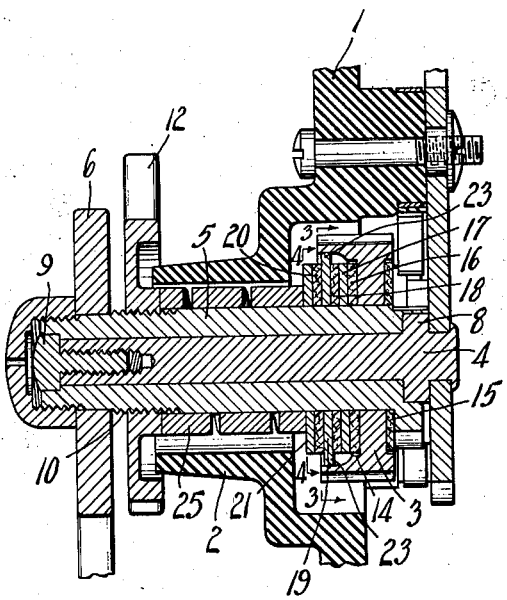
Figure 1 is a cross-sectional detail view of the drag handle assembly.
Figure 2:
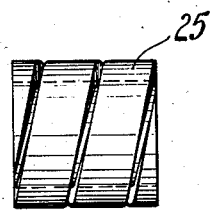
Figure 2 is a detail view of the spring sleeve through which the greater adjustability is secured.
Figure 3:
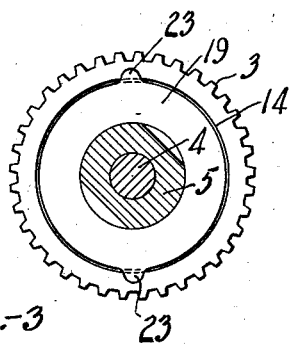
Figure 3 is a cross-section on the line 3—3 of Figure 1.
Figure 4:
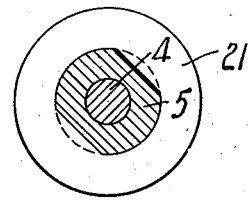
Figure 4 is a cross-section on the line 4—4 of Figure 1.

In the mechanism shown, 1 represents the front plate of a reel construction, formed with the upstanding drag-mechanism housing 2, the inner end of which is hollowed out to receive the spool driving gear 3 having geared connection with the spool in the usual manner. Centrally of the housing is the post 4 anchored in the bridge on the front plate. The hollow drive shaft 5 is rotatably mounted on this post and to the outer end of the shaft is fixed the handle 6. The shaft is held in position between a shoulder 8 in the base of the post and a set-screw 9 on the outer end of the post.

Between the handle 6 and the upper end of the housing, the shaft is screw-threaded as at 10 to receive the rotatable compacting star-wheel 12 by which the pressure of the friction elements is adjusted.

The gear 3 is recessed on its outer face thus providing a surrounding flange 14. Against the inner face of the gear is located a fibre friction washer 15 and against the opposite face is a second friction washer 16. On top of the washer 16 is a metal washer 17, then another fibre washer 18, a metal washer 19, a fibre washer 20 and a metal washer 21, there being alternating metal and fibre washers. The metal washers 17 and 21 have a sliding but non-rotative fit with the hollow drive shaft and the metal washer 19 has a feather connection with the gear through tips 23 engaging grooves in the flange of the gear 3. A very compact and effective friction drag mechanism is thus provided and the degree of friction may be varied as the pile is compressed.

The compression of the pile is secured by the operation of the star-wheel which transmits its pressure through a sleeve 25. This sleeve is in the form of a long helical spring, the cross-section of which is rectangular. The pitch of the helix and the spaces between adjacent coils and the number of coils are important factors in the success of the device. A successful helical spring construction (considerably enlarged) is illustrated in the drawing, the arrangement being such that full compression of the spring, whereby its adjacent convolutions are brought into abutting relation, may be effected by axial movement of the star-wheel 12 to the maximum extent of .050 inches.

As the star-wheel is rotated to increase the friction the spring sleeve will be forced together, thus exerting increased pressure upon the friction disk pile until the spring is completely closed when the pressure and friction will be the greatest. By making the sleeve a helical spring over its entire length, a greater range and accuracy of adjustment is possible for the degree of rotation of the star-wheel from relaxed to full-on position, as compared to my prior patent aforementioned, yet providing a non-yielding connection between the star-wheel and the friction disks when desired.

This improvement is substantial and is secured without increasing the bulk of the reel in any manner. The invention is not limited to exact conformity with the details shown as will be understood by those skilled in the art.

What is claimed is:

A drag mechanism for fishing reels comprising a driving gear, a shaft on which said gear is mounted for rotation, a pile of friction discs encircling said shaft to exert a drag upon said gear, a manually operable member mounted for axial adjustment on said shaft, and a compressible helical spring encircling said shaft and having one end adapted for engagement with said manually operable member and its other end adapted for engagement with said pile of friction discs whereby the rotation of said gear may be progressively varied frictionally, said manually operable member being movable to two extremes, one in which said spring is compressed to effect a maximum frictional resistance on the rotation of said gear and the other in which the compression of said spring is negligible to effect a minimum frictional resistance on the rotation of said gear, said manually operable member being selectively adjustable between said two extremes whereby the frictional resistance to the rotation of said gear may be progressively varied.

WALTER L. ADAMS.